US008393674B2

(12) United States Patent
Keegan et al.

(10) Patent No.: US 8,393,674 B2
(45) Date of Patent: Mar. 12, 2013

(54) INFANT CHILD RESTRAINT SYSTEM

(75) Inventors: Charles H. Keegan, Milton, MA (US); Phillip A. Przybylo, Waxhaw, NC (US); Stephen B. Oltman, Hope, IN (US)

(73) Assignees: Goodbaby Child Product Co., Ltd., Jiangsu Province (CN); Cosco Management, Inc., Wilmington, DE (US)

( * ) Notice: Subject to any disclaimer, the term of this patent is extended or adjusted under 35 U.S.C. 154(b) by 180 days.

(21) Appl. No.: 13/004,092

(22) Filed: Jan. 11, 2011

(65) Prior Publication Data

US 2012/0013157 A1 Jan. 19, 2012

Related U.S. Application Data

(60) Provisional application No. 61/293,731, filed on Jan. 11, 2010.

(51) Int. Cl.
*B60N 2/42* (2006.01)
*A47D 1/10* (2006.01)

(52) U.S. Cl. .................................. 297/216.11

(58) Field of Classification Search ............... 297/250.1, 297/216.11, 219.12, 452.29
See application file for complete search history.

(56) References Cited

U.S. PATENT DOCUMENTS

| | | | |
|---|---|---|---|
| 4,943,113 A | 7/1990 | Meeker | |
| 5,385,387 A | 1/1995 | Kain | |
| 5,478,135 A | 12/1995 | Kain | |
| 5,564,778 A | 10/1996 | Shimer et al. | |
| 5,567,008 A | 10/1996 | Cone, II | |
| 5,997,086 A | 12/1999 | Gibson et al. | |
| 6,017,088 A | 1/2000 | Stephens et al. | |
| 6,106,057 A * | 8/2000 | Lee | 297/180.14 |
| 6,183,044 B1 | 2/2001 | Koyanagi et al. | |
| 6,299,249 B1 | 10/2001 | Mori | |
| 6,347,832 B2 | 2/2002 | Mori | |
| 6,607,243 B2 * | 8/2003 | Kain | 297/250.1 |
| 6,669,288 B2 | 12/2003 | Nakagawa et al. | |
| 6,979,057 B2 | 12/2005 | Sedlack | |
| 7,404,593 B2 | 7/2008 | Cormier et al. | |
| 7,484,801 B2 | 2/2009 | Kassai et al. | |
| 7,506,926 B2 * | 3/2009 | Carine | 297/216.12 |
| 7,597,396 B2 | 10/2009 | Longenecker et al. | |
| 7,658,446 B2 | 2/2010 | Meeker et al. | |
| 8,186,757 B2 | 5/2012 | Duncan et al. | |
| 2002/0074840 A1 | 6/2002 | Nakagawa et al. | |
| 2003/0209926 A1 | 11/2003 | Nakagawa et al. | |
| 2004/0169406 A1 * | 9/2004 | Yoshida | 297/216.11 |

(Continued)

OTHER PUBLICATIONS

SAE International (2008); 09B-0334; William Van Arsdell et al.; "Effect of Padding on Child Restraint Performance during Side Impact Collisions".

(Continued)

*Primary Examiner* — Milton Nelson, Jr.

(74) *Attorney, Agent, or Firm* — Nields, Lemack & Frame, LLC

(57) ABSTRACT

An infant car seat having an outer shell, a protective layer, and a padded fabric cover covering the protective layer is disclosed. The protective layer is preferably made of a polymer, such as expanded polystyrene, and includes a plurality of crush ribs. The spacing of these crush ribs is varied in accordance with the size of the infant. The spacing of these crush ribs determines the stiffness of the layer. In other words, closer spaced ribs offer more resistance to compression, and are therefore stiffer. Ribs that are spaced further apart offer less resistance to compression, and are therefore softer. By varying the spacing of the ribs, the stiffness of the protective layer varies in accordance with the infant's size. Alternatively, or additionally, the width of the crush ribs can be varied to achieve a similar result.

17 Claims, 5 Drawing Sheets

U.S. PATENT DOCUMENTS

| | | |
|---|---|---|
| 2004/0207243 A1 | 10/2004 | Sedlack |
| 2005/0110318 A1 | 5/2005 | Meeker et al. |
| 2005/0264062 A1 | 12/2005 | Longenecker et al. |
| 2006/0273640 A1 | 12/2006 | Kassai et al. |
| 2008/0169692 A1* | 7/2008 | Clement et al. ............ 297/250.1 |
| 2008/0224516 A1 | 9/2008 | Vegt |
| 2008/0258518 A1* | 10/2008 | Jane Santamaria ...... 297/216.11 |
| 2009/0066125 A1* | 3/2009 | Nett et al. ................ 297/216.11 |
| 2010/0019557 A1 | 1/2010 | Longenecker et al. |
| 2011/0169310 A1 | 7/2011 | Keegan et al. |
| 2011/0304178 A1* | 12/2011 | Rajasingham ........... 297/216.11 |
| 2012/0013160 A1 | 1/2012 | Williams et al. |

OTHER PUBLICATIONS

Office Action mailed Jul. 13, 2012 in co-pending U.S. Appl. No. 12/971,216.

* cited by examiner

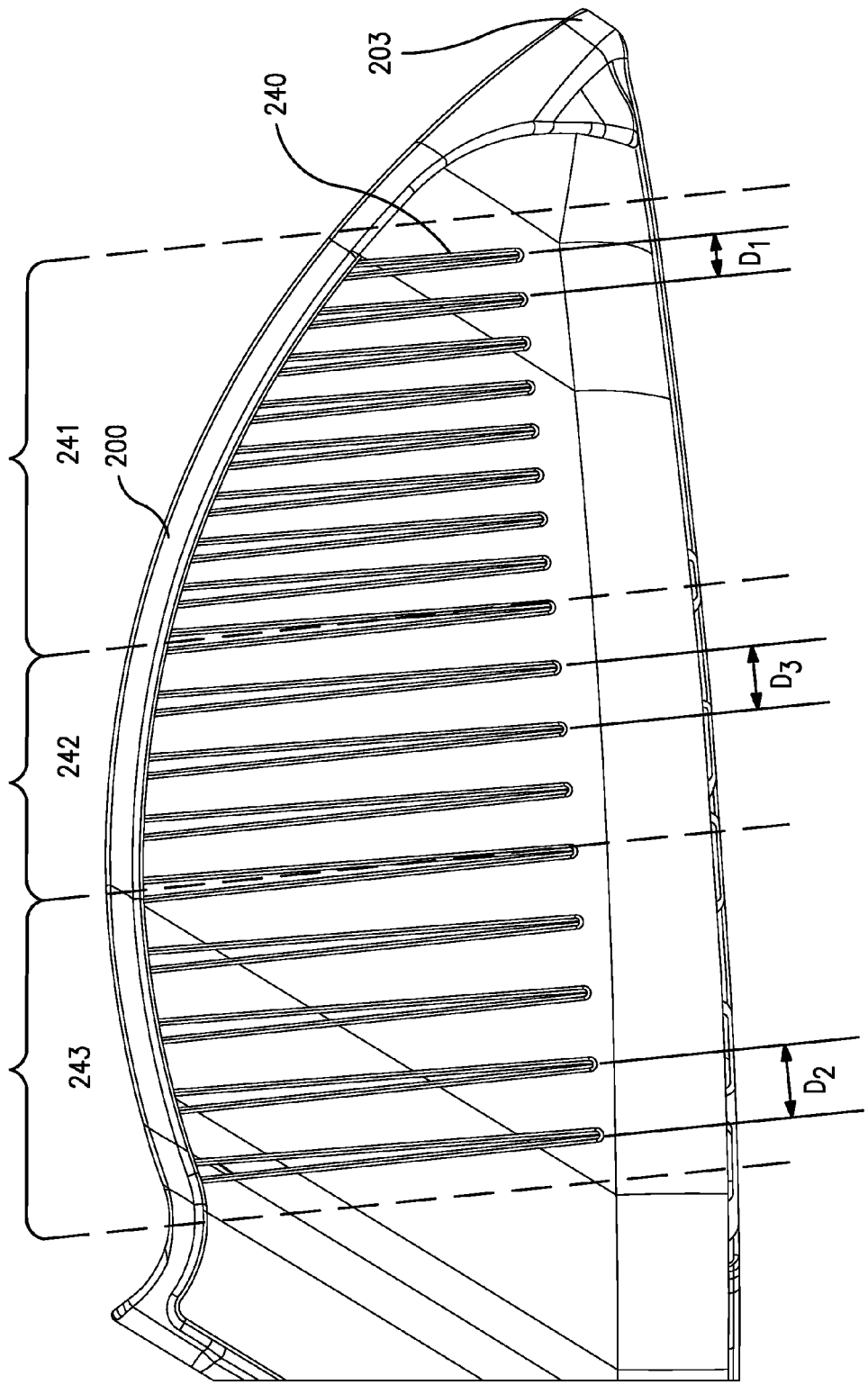

INFANT CHILD RESTRAINT SYSTEM

This application claims priority of U.S. Provisional Patent Application Ser. No. 61/293,731, filed Jan. 11, 2010, the disclosure of which is incorporated herein by reference in its entirety.

BACKGROUND OF THE INVENTION

Infant child restraint systems are well known in the art. Typically, the infant child restraint system is made up of two parts; an infant car seat and a base into which the infant car seat is mounted. Typically, the base is positioned on the seat of a vehicle, such as a car, truck, train or airplane, and secured using the restraint system of the vehicle, or a latch system. For example, a base is typically secured in place on an automobile seat through the use of the vehicle's seat belt or a latch system.

The infant car seat is then attached to the base, typically using one or more connection points. This allows the base to be left secured to the vehicle seat, while only the baby seat is removed. To provide maximum protection to the infant, the infant seat is typically oriented such that the infant's feet are nearest the seat back.

There are a number of issues associated with each of these two components. For example, as stated above, the base is typically secured to the vehicle seat via the restraint system. Typically, the restraint system consists of a lap belt, which is a horizontally disposed belt that passes across the passenger at the waist. The restraint system also includes a shoulder belt, which typically is slanted and positioned from the waist of the passenger on one side to the opposite shoulder. Alternatively, a latch system can be employed.

The base must be secured using typically the lap and shoulder belt. Given the single axis of restraint, it is important that the weight of the base (with the baby seat) is properly distributed. If the belt crosses the base at an unstable position, it is possible that the base may be able to rotate about this axis of restraint, especially in the case of a sudden change in motion, such as sudden braking or crash impact.

In the event of a sudden deceleration or crash impact, it is essential to protect the baby secured in the car seat. Typically, this is done by providing a hard exterior shell, and a second layer inside the shell, made with a material designed to absorb the compression forces during an impact. In many embodiments, this material is a polymer, such as expanded polystyrene (EPS), expanded polypropylene (EPP) or another impact absorbing material. Closest to the infant is a softer pad. To protect the infant in the event of a crash, it is important that the second layer be strong enough to absorb the compression forces. However, if the impact absorbing material is too hard, the force of impact will be transferred to the infant and specifically the spine and head regions. In addition, car seats accommodate infants of various sizes, from less than 10 pounds to those exceeding 25 pounds.

Obviously, the amount of force generated by a 10 pound infant is very different than that created by a 25 pound infant. In addition, the strength of an infant's bones and muscles varies with the size and age of the infant. In other words, a newborn cannot withstand significant impact, while an older, heavier infant can withstand significantly more force. Thus, if the impact absorbing support layer is too stiff, the newborn infant may be injured during an impact. On the other hand, if the impact absorbing support layer is too soft, a heavier baby may not be adequately protected by the support.

It would be beneficial if the issues associated with protecting infants of various sizes and ages could be addressed in a safe, convenient and cost effective manner.

SUMMARY

The problems of the prior art are addressed by a novel infant child restraint system. This infant car seat has an outer shell, a protective layer, and a padded fabric cover covering the protective layer. The protective layer is preferably made of a polymer, such as expanded polystyrene, and includes a plurality of crush ribs. The spacing of these crush ribs is varied in accordance with the size of the infant. The spacing of these crush ribs determines the stiffness of the layer. In other words, closer spaced ribs offer more resistance to compression, and are therefore stiffer. Ribs that are spaced further apart offer less resistance to compression, and are therefore softer. By varying the spacing of the ribs, the stiffness of the protective layer varies in accordance with the infant's size. Alternatively, or additionally, the width of the crush ribs can be varied to achieve a similar result.

BRIEF DESCRIPTION OF THE DRAWINGS

FIG. 5 shows the crush rib pattern in accordance with a first embodiment.

DETAILED DESCRIPTION OF THE INVENTION

Figure 1:
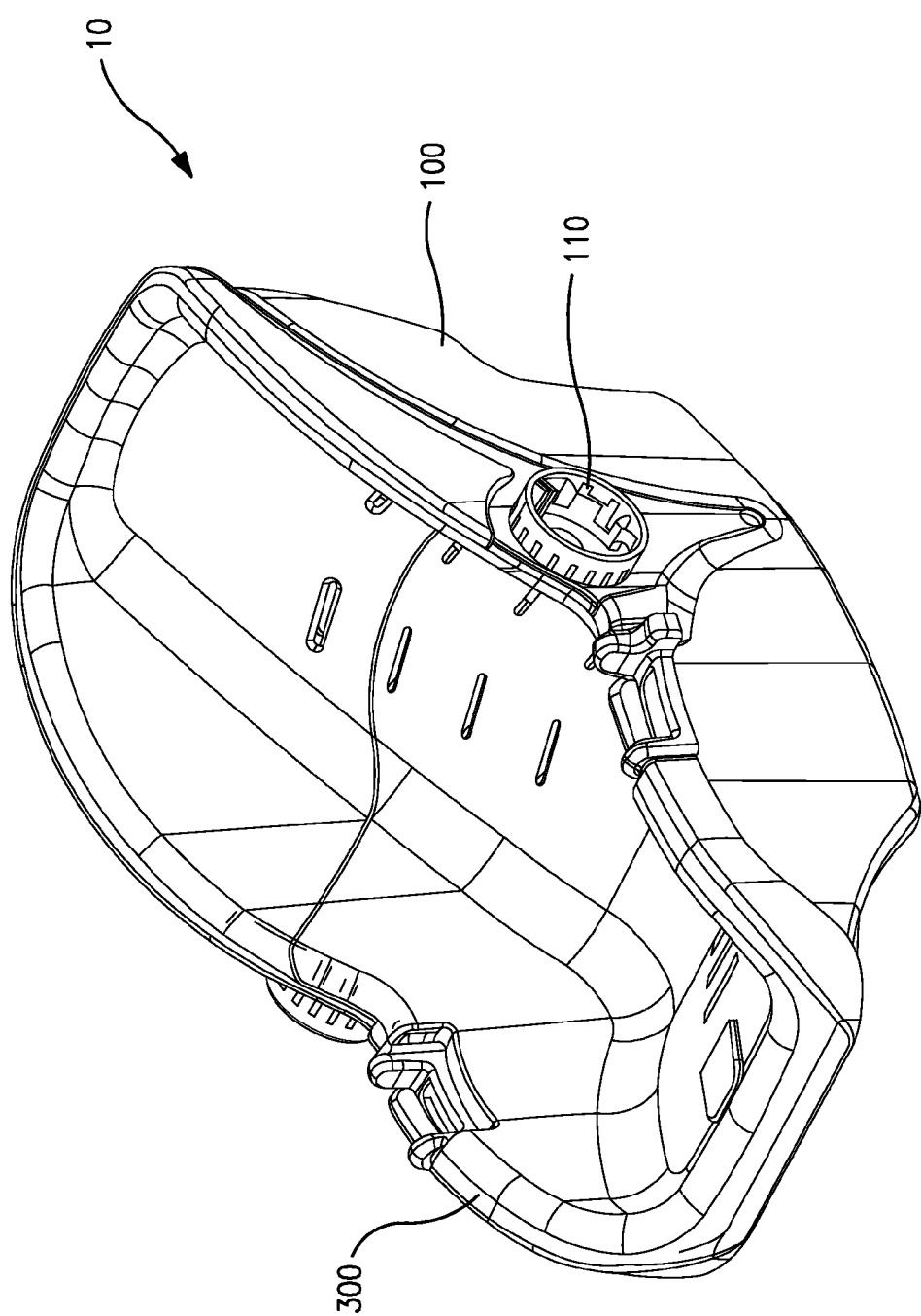
FIG. 1 is a perspective view of the infant car seat according to one embodiment of the present invention.

FIG. 1 shows a perspective view of the infant car seat in accordance with certain embodiments. Features, such as the handle, locking mechanisms, and canopy have been removed to aid in understanding. The seat 10 has an exterior shell 100, made of hard plastic, such as polypropylene. The exterior shell has a variety of features, such as the connection 110 for the handle (not shown). Located in the shell 100 is the protective layer (not shown). This protective layer is completely covered by the padded cover 300. This cover is preferably made of fabric, such as cotton or a polyester blend.

Figure 2:
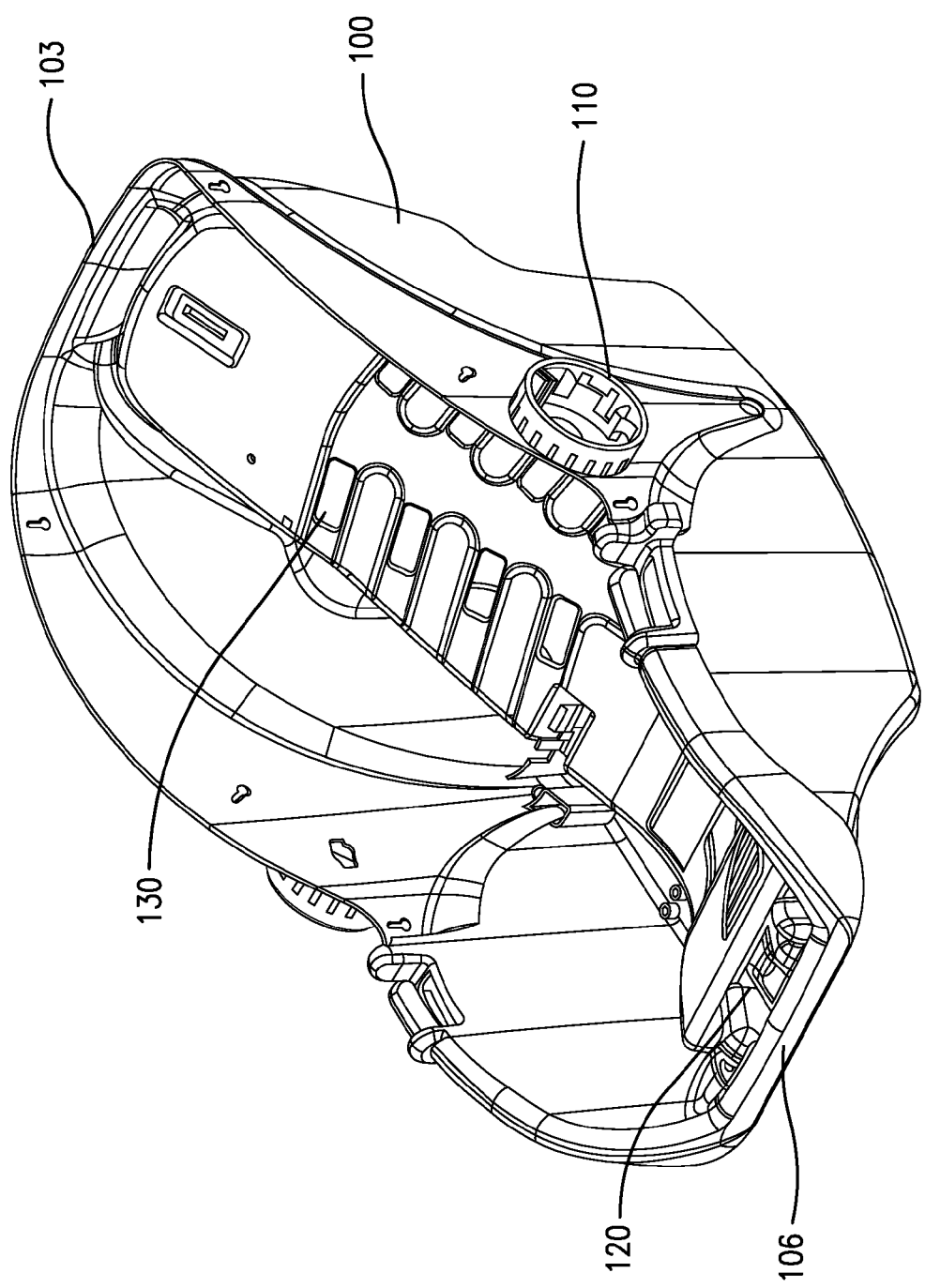
FIG. 2 is an expanded view of the exterior shell of the car seat of FIG. 1.

FIG. 2 shows the exterior shell 100 isolated from the other components. The shell has a head end 103 and a foot end 106. The inner surface of the shell 100 is substantially planar for a first portion, corresponding to the infant's upper body and head. The inner surface of the shell then bends, or is curved, at a location corresponding to the infant's waist, and has a second substantially planar portion, corresponding to the infant's lower body. The shell is typically designed so that the second portion slopes upward, so that the infant's feet at elevated above their waist. The shell also has sides which extend upward, thereby forming a cavity, which is protected on all sides.

The infant car seat is typically installed in the vehicle such that the head end 103 is furthest from the seat back. In other words, the infant's feet are closest to the seat back. Thus, in the event of sudden deceleration or impact, the force will cause the infant to be pushed toward the head end 103 of the shell 100.

As described above, the exterior shell includes the connection 110 for the handle. In addition, the shell is molded to accommodate the connection mechanism 120 for attaching the car seat to its base. Additionally, the exterior shell may include a plurality of slots 130 through which one or more restraints may pass, such a straps or the like, securing the infant to the car seat.

Figure 3:
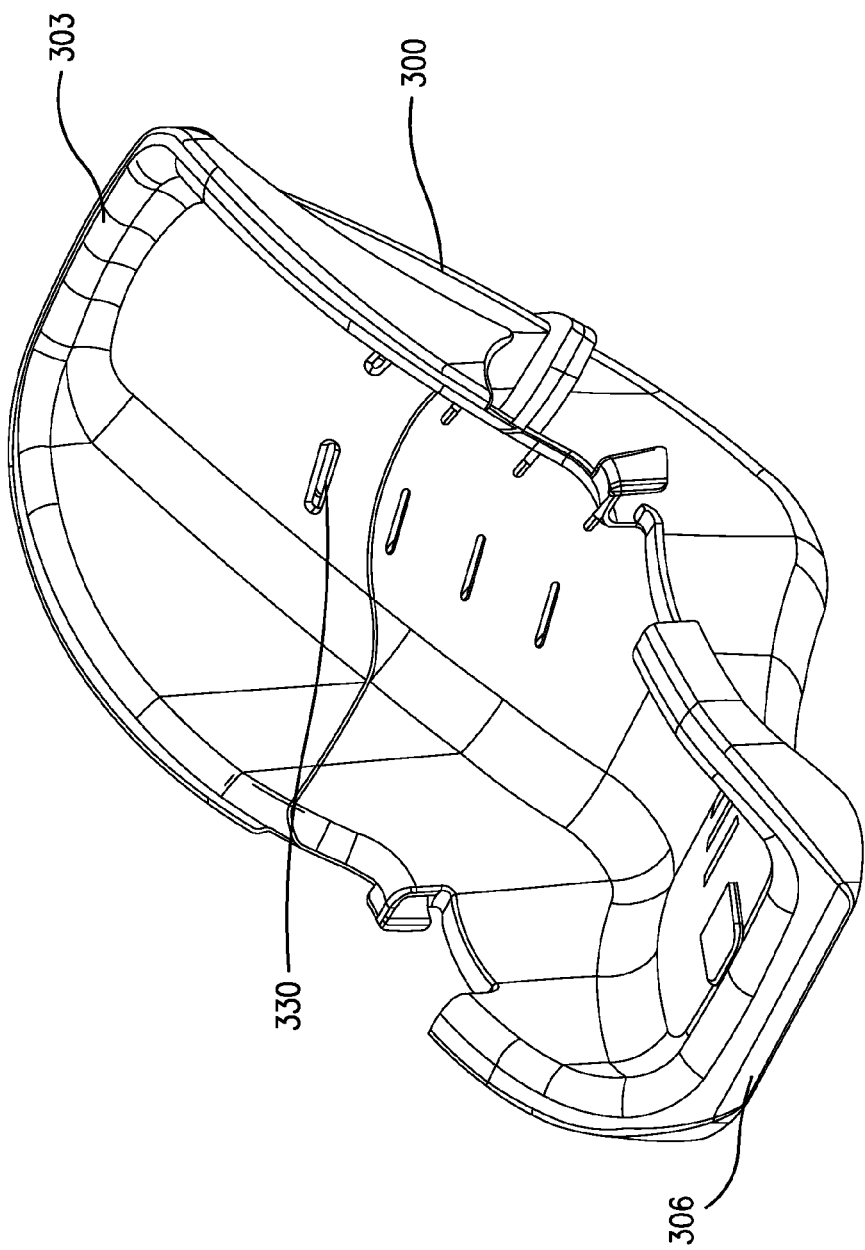
FIG. 3 is an expanded view of the padded cover.

FIG. 3 shows the padded cover 300 isolated from the other components. Like the shell 100, the padded cover 300 has a head end 303 and a foot end 306. The padded cover 300 generally follows the contour of the exterior shell and therefore is roughly planar for a first portion, corresponding to the infant's upper body and head. The inner surface of the shell then bends, or is curved, at a location corresponding to the infant's waist, and has a second linear planar portion, corresponding to the infant's lower body. The padded cover is typically designed so that the second portion slopes upward, so that the infant's feet at elevated above their waist. The locations of slots 330 correspond to the locations of slots 130 in shell 100 (see FIG. 2), so that when the pad 300 is properly positioned with respect to the shell 100, each of the slots 300 registers with a corresponding slot 130.

Figure 4:
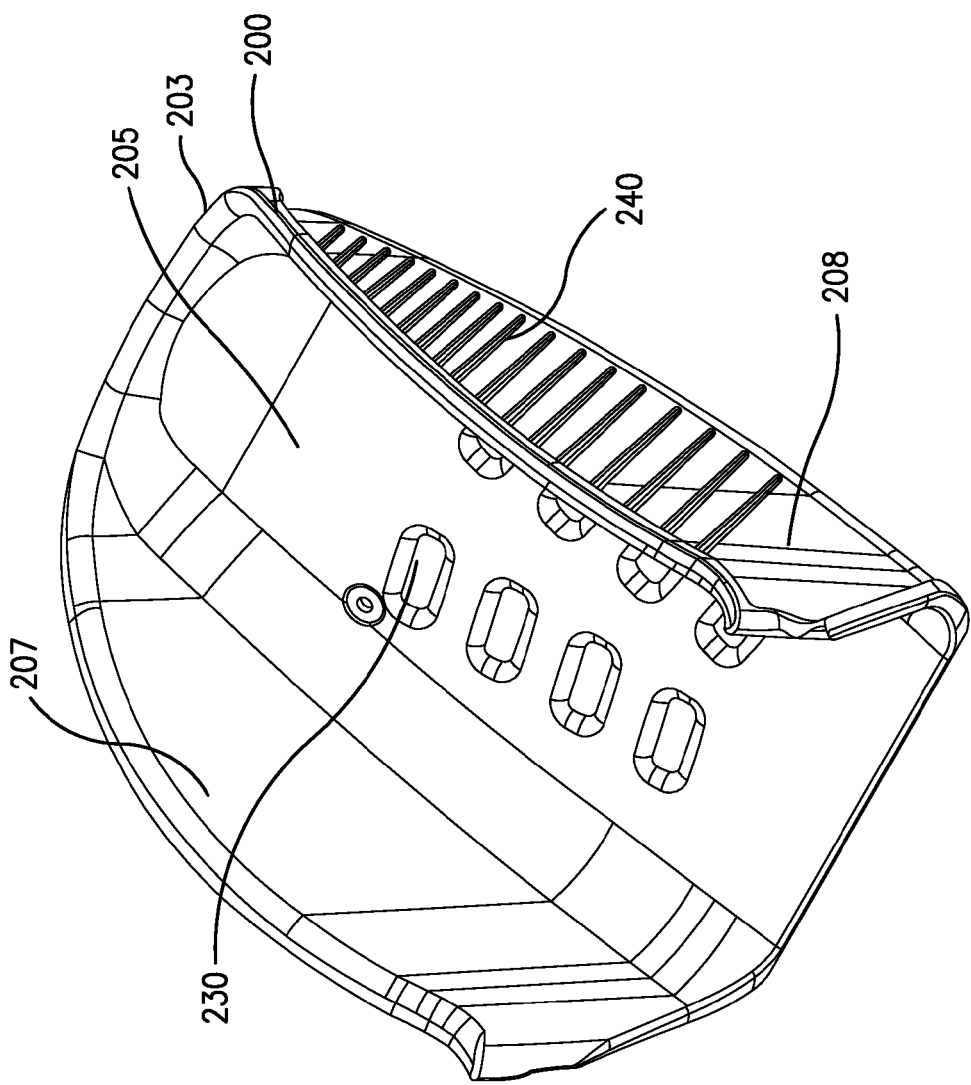
FIG. 4 is a expanded view of the protective layer.

FIG. 4 shows the protective layer 200 in isolation. Since this layer is located between the exterior shell 100 and the padded cover 300, it is not visible when the car seat is fully assembled. Since the majority of force in an impact is directed toward the head end, the protective layer 200 only has a head portion, which fits between the head end of the shell 100 and the head end of the padded cover 300. The protective layer 200 is roughly U-shaped in cross section, having a flat portion 205, adapted to be beneath the infant's body, and two side walls 207,208 on either side of this flat portion 205. Like the other components, the flat portion 205 contains slots 230 for restraints that register with slots 330 and 130 when the protective layer 200, padded cover 300 and shell 100 are in the assembled condition. The protective layer also includes a plurality of crush ribs 240 along both side walls 207, 208. These crush ribs 240 may in contact with the exterior shell 100 when in the assembled condition. In those sidewall regions between the crush ribs 240, air occupies the space between the protective layer and the exterior shell.

Therefore, in those areas where the crush ribs are spaced far apart, there is limited direct contact between the protective layer 200 and the exterior shell 100. This causes the protective layer 200 to more readily deform upon impact, thereby absorbing a significant amount of the force of impact. Conversely, in those areas where the crush ribs are spaced closer together, there is more direct contact between the protective layer and the shell, thereby transferring more of the impact to the infant.

FIG. 4 shows crush ribs 240 on the side walls 207,208 of the protective layer 200. These crush ribs 240 serve to protect the infant during a side impact. In another embodiment, crush ribs, similar to those shown on the sidewalls 207, 208 of FIG. 4 can be placed on the bottom side of the flat portion 205 of the protective layer 200 to further protect an infant in the event of a front or rear impact.

FIG. 5 shows the crush rib pattern in accordance with a first embodiment. The crush ribs are elongated longitudinal members extending generally perpendicularly to the longitudinal center axis of the protective layer 200. The crush ribs closest to the head end 203 are spaced closest together, at a distance $D_1$, measured from the longitudinal centerline of each rib. Those crush ribs furthest from the head end 203 are spaced furthest apart, at a distance $D_2$. Those crush ribs between these may be spaced at a distance between $D_1$ and $D_2$, such as $D_3$.

In the illustrated embodiment, the crush ribs are defined by 3 regions, shown as 241, 242, and 243, wherein the spacing between all crush ribs in a region is constant. The spacing between adjacent crush ribs in region 241 is distance $D_1$, while the spacing between adjacent crush ribs in region 242 is distance $D_3$ and the spacing between adjacent crush ribs in region 243 is distance $D_2$.

Thus, when the infant is small, the infant's head is most probably located in the space between the side walls 207, 208 in region 243, which has the largest spacing. This region offers the most compression of the protective layer, reducing the possibility of injury to the baby. In other words, in the event of an impact, the protective layer compresses, thereby absorbing most of the force of the impact. Since the infant is small, the high compression of the protective layer is not problematic, as the weight of the baby is insufficient to fully compress the protective layer, such that it contacts the exterior shell 100.

As the infant grows, the head is located in the space between the side walls 207, 208 in region 242, and finally in the space between the side walls 207, 208 in region 241. At this point, the weight of the size and infant are such that the spacing in region 243 is no longer effective. This wide spacing would offer too much compression and the infant's increased weight would transfer the force to the exterior shell. Thus, the spacing of the crush ribs is reduced, offering a higher compression force, and insuring that the infant's head does not absorb the full force of the impact.

In one embodiment, the crush ribs are about 16 mm wide at the top of the sidewall, and taper to about 5 mm near the bottom of the sidewall. This taper is to allow easier removal from the mold when the protective layer 200 is created. The crush ribs can extend the entire height of the sidewalls 207, 208, which may be about 120 mm at its highest point. As the shape of the sidewalls is not rectangular, some crush ribs may be taller than others. In another embodiment, all of the crush ribs are of equal height.

The crush ribs extend outward from the sidewalls by about 5 mm, although other dimensions are within the scope of the invention. In some embodiments, the crush ribs rest against the exterior shell 100. In other embodiments, there is a layer of air between the crush ribs and the exterior shell. In other embodiments, some of the crush ribs contact the exterior shell, while others are not in contact.

Returning to FIG. 5, in one embodiment, the crush ribs in region 241 are about 7-12 mm apart, while the crush ribs in region 242 are 15-20 mm apart and the ribs in region 243 are 25-30 mm apart. In other embodiments, these dimensions may differ.

While FIG. 5 shows three regions, each having a constant inter-rib spacing, the invention is not limited to this embodiment. For example, more regions can be employed, each with a constant spacing. In other embodiments, a region may be defined to comprise a single spacing between two adjacent crush ribs. In another embodiment, the spacing between each adjacent pair of crush ribs may be different. In other embodiments, a combination of these alternatives may be used, where two or more adjacent spacings are grouped into a single region, while at least one other single spacing is defined as its own region. For example, in FIG. 5, the crush ribs are grouped into three regions where region 243 has 4 spacings, region 242 has 4 spacings and region 241 has 8 spacings. In another embodiment, four regions of 4 spacings each can be used. In another embodiment, the spacing between each pair of crush ribs may be distinct. For example, in one embodiment, the spacing between pairs of crush ribs increases as one moved away from the head end. In another embodiment, the 16 spacings are separated into 5 groups, where three regions have four spacings, one region has a single spacing and the remaining region has 3 spacings. In addition, the number of crush ribs can be varied as desired.

In another embodiment, the spacing between crush ribs is maintained, however, the thickness of the individual crush ribs is varied. Referring to FIG. 5, in this embodiment the region 243 would have narrow crush ribs, allowing the most compression. Region 241 would have the widest crush ribs, offering the most stiffness. Crush ribs in region 242 may have a width between these two regions. As described above with respect to spacing, the crush rib widths can be varied in any pattern. Each may have a distinct width, or the crush ribs can be grouped in regions, where all crush ribs within a region have the same width.

In some embodiments, the widths of the crush ribs vary from about 5 mm to about 25 mm, where the widest crush ribs are located nearest the head end, and the narrowest are furthest from the head end.

In another embodiment, a combination of crush rib width and spacing can be employed to vary the compression force throughout the length of the protective layer. The widths and spacings can be defined as required.

As described above, in another embodiment, crush ribs can be molded onto the bottom of the flat portion 205. The width and spacings of these ribs may be similar to those described above in reference to crush ribs 240.

In the case of crush ribs located on the bottom of the flat portion, it may be preferable to have these crush ribs be tapered along their width. In other words, the rib may be 16 mm at the point where it meets the bottom surface of the flat portion, and taper to 7-10 mm at its distal end (where it contacts the exterior shell). This allows the ribs to be more easily removed from the mold after fabrication.

In these embodiments, it is an objective that the protective layer has a first compression force near the head end. The compression force is less (i.e. the layer compresses more easily) at the end furthest from the head end than this first compression force. In some embodiments, the compression force decreases moving away from the head end. In other embodiments, the compression force does not increase moving away from the head end (allowing the compression force to remain constant during one or more portions of the protective layer.

What is claimed is:

1. An infant car seat, comprising:
   a hard exterior shell;
   a padded cover; and
   a protective layer, located between said hard exterior shell and said padded cover, comprising:
      a plurality of crush ribs located on a surface closest to said hard exterior shell, wherein said plurality of crush ribs comprise two or more regions wherein spacing between adjacent crush ribs in each region is constant and wherein said spacing between adjacent crush ribs is different for each region.

2. The infant car seat of claim 1, wherein said protective layer is made from a material from the group consisting of expanded polystyrene, expanded polypropylene and another impact absorbing material.

3. The infant car set of claim 1, wherein said protective layer comprises two sidewalls and a flat portion between said sidewalls, and wherein said crush ribs are located on said sidewalls.

4. The infant car seat of claim 3, wherein said crush ribs are located on said flat portion.

5. The infant car seat of claim 1, wherein said protective layer comprises a head end configured to support an infant's head and an end opposite said head end, and wherein said spacing in a region nearest said head end is less than said spacing in a region further from said head end.

6. The infant car seat of claim 2, comprising at least three regions wherein spacing in a first region nearest said head end is smallest of said at least three regions and spacing in a second region furthest from said head end is greatest of said at least three regions.

7. The infant car seat of claim 6, wherein said spacing in said second region is between 25 and 30 mm.

8. The infant car seat of claim 6, wherein said spacing in a third region, located between said first region and said second region is between 15 and 20 mm.

9. The infant car seat of claim 6, wherein said spacing in said first region is between 7 and 12 mm.

10. An infant car seat, comprising:
    a hard exterior shell;
    a padded cover; and
    a protective layer, located between said hard exterior shell and said padded cover and comprising crush ribs located on a surface closest to said exterior shell, wherein said protective layer comprises a head end configured to support an infant's head and an end opposite said head end, said protective layer comprises a plurality of regions wherein each region compresses a different amount in response to an impact.

11. The car seat of claim 10, wherein said protective layer is made from a material from the group consisting of expanded polystyrene, expanded polypropylene and another impact absorbing material.

12. The infant car seat of claim 10, wherein each crush rib has a width, and the width of said crush ribs in each region is constant and said width is different for each region.

13. The infant car seat of claim 12, wherein said width of said crush ribs is largest in a region nearest said head end.

14. The infant car seat of claim 10, wherein spacing between adjacent crush ribs in each region is constant; and said spacing is different for each region.

15. The infant car seat of claim 14, wherein said spacing is smallest in a region nearest said head end.

16. The infant car seat of claim 14, wherein each crush rib has a width, and the width of said crush ribs in each region is constant and said width is different for each region.

17. The infant car seat of claim 16, wherein said width of said crush ribs is largest in a region nearest said head end.

* * * * *